United States Patent [19]

Stearns

[11] Patent Number: 5,241,826
[45] Date of Patent: Sep. 7, 1993

[54] FIXED GEOMETRY VARIABLE DISPLACEMENT PUMP SYSTEM

[76] Inventor: Charles F. Stearns, 60 Fernwood Dr., E. Longmeadow, Mass. 01028

[21] Appl. No.: 917,765

[22] Filed: Jul. 21, 1992

[51] Int. Cl.$^5$ ............................................. F02C 7/236
[52] U.S. Cl. ........................................ 60/736; 60/734
[58] Field of Search .................... 60/734, 39.094, 736, 60/243, 39.141; 417/287, 426

[56] References Cited

U.S. PATENT DOCUMENTS

| | | | |
|---|---|---|---|
| 2,968,348 | 1/1961 | Fortman | 60/243 |
| 3,215,346 | 11/1965 | Albarani | 60/39.281 |
| 4,245,964 | 1/1981 | Rannenberg | 417/287 |
| 4,760,696 | 8/1988 | Rooks et al. | 60/734 |
| 5,116,362 | 5/1992 | Arline et al. | 60/734 |
| 5,118,258 | 6/1992 | Martin | 417/426 |
| 5,152,146 | 10/1992 | Butler | 60/736 |

*Primary Examiner*—Richard A. Bertsch
*Assistant Examiner*—Timothy S. Thorpe
*Attorney, Agent, or Firm*—Norman Friedland

[57] ABSTRACT

A fluid pumping system that maintains the temperature rise at a minimum value of the fluid being recirculated in the pumps during a given operating condition in the pumping system's operating envelope be disclosed. A pair of positive displacement pumps judiciously sized at different capacities are driven by a differential pumping or gearing system that is driven by a single source and cooperates with a fluid circuit delivering flow to a receiver so that the relationship of the pressure in the fluid circuit bears a given relationship to the flow capacity produced by each pump at given operating points in the operating envelope. The circuit includes a resistance in one line leading to and from one of the pumps that exhibit different resistance to the flow when flowing in one direction as opposed to the flow in the reverse direction and a valve, responding to a control for attaining the demands placed on said receiver, in another flow line in the circuit controls the capacity of each of the pumps and hence the flow being delivered to the receiver. The system is particularly efficacious for controlling fuel flow to the combustor of a gas turbine engine used in aircraft or industrial applications.

10 Claims, 9 Drawing Sheets

FIXED GEOMETRY VARIABLE DISPLACEMENT PUMP SYSTEM

TECHNICAL FIELD

This invention relates to a fluid positive displacement pumping system which varies the flow without varying the geometry/pistons of the pumps.

BACKGROUND OF THE INVENTION

As is well known in the aeronautical field of technology the fuel pumping systems for turbine types of power plants are relatively complex owing to the fact that the pumping system must meet the demands of fuel flow for every engine operation. Of all the types of fuel pumping systems, perhaps, the most efficacious pumping system from a standpoint of cost effectiveness and reliability is the positive displacement types, i.e. gears, vanes or pistons, that utilize a valve to by-pass excess fuel.

However, one of the major problems associated with the pumping system is the high temperature rise in the fuel occasioned by by-passing excess fuel during certain engine operations. Hence, from idle which is at the low demand of the spectrum to take-off which in commercial aviation is at the high demand of the spectrum the fuel pumping system must almost instantly supply the volume of fuel at the proper pressure levels from a low fuel flow to a high fuel flow. Of necessity, the fuel pumping system will continually by-pass a certain percentage of the total fuel being pumped and return this excess fuel to the pump's inlet.

Obviously, the by-pass flow that recirculates through the pump continues to extract heat from the pumping operation with a consequential rise in fuel temperature contributing to the constraints of the pumping system's hardware.

Obviously, any system that can reduce fuel temperature during this operating condition would immensely contribute to the efficacy of the overall fuel system. For example, in gas turbine power plants the utilization of this invention would not only eliminate the complex and heavy mechanism that is customarily used to vary the geometry of the pump or the piston stroke, but it also would eliminate the customary use of the complex by-pass valve and the complex control system. As will be appreciated from the description to follow and in accordance with this invention the control of the pumping system is inherent thereby eliminating the complexity associated with the control system.

It is contemplated within the scope of this invention, that when employed in a gas turbine engine, this invention will be made compatible with existing fuel control systems. Examples of such systems are the full authority digital electronic control system (FADEC), the supervisory control system or the hydromechanical fuel control systems. Obviously, FADEC systems utilize electrohydromechanical valves which differ from those utilized in other types of systems. However, this invention can still be employed with substitute types of flow control apparatus. It will be appreciated that from the discussion to follow that this inventive concept can be adapted to most, if not all, new and proposed fuel or engine control systems for gas turbine engines that provide a signal indicative of the amount of fuel being demanded.

As an integral part of a fuel system for a gas turbine engine, whether powering aircraft or other vehicles or used as an industrial application this inventive system will control the fuel flow to the engine from a maximum to minimum fuel flow ratio of say, 37 to 1, without incurring excessive rise in the temperature of the fuel. As will be discussed in more detail hereinbelow this invention also inherently eliminates the necessity for fuel metering valves and/or flow meters inasmuch as this invention can be readily and easily adapted to calculate the fuel flow since it can be easily synthesized merely by measuring pump speed and fuel temperature.

Another important aspect of this invention is that it affords the ability to readily and easily monitor the health of the engine's pumping system and the amount of fuel being delivered to the engine. As will be evident from the description to follow, the pumping operating parameters are readily available and can easily be computed and lend themselves to be indicative of certain conditions of the pump.

While in its preferred embodiment, this invention is being contemplated for use in the field of aeronautics, as one skilled in this art will appreciate, this invention has utility in any positive displacement pumping system that requires by-passing fluid during the low power regime of the operating envelope. For example, it is contemplated within the scope of this invention that it can be utilized in a fluid drive system for say automobiles that use a pumping system to propel the vehicle by driving the automobile's wheel with a hydraulic motor. In this instance, the positive displacement pumps would generate the pressure and flow to drive the hydraulic motors that would be operatively connected to the wheel.

By way of illustration and without limitation another application where this invention has utility is in heavy equipment, as cranes, jacks, lifts, hydraulic elevators and the like which require large actuators.

This invention contemplates utilizing a planetary gearing system that uses the auxiliary drive of the engine to drive the sun gear which, in turn, drives the ring gear for driving one of the positive displacement pumps and the cage of the planetary gears for driving the other pump. By proper and judicial sizing of the positive displacement pumps which may be, for example, gear pumps and its judicious fluid flow circuitry interconnecting the EHV or other suitable flow control apparatus and the engine's combustor, fuel flow is properly metered on demand while the pumping system adjusts its pressure and flow requirements during the low power operations of the operating envelope to avoid the high fuel temperature rise which other wise would occur.

SUMMARY OF THE INVENTION

An object of this invention is to provide an improved pumping system.

A feature of this invention is to utilize a planetary gearing system to drive a judiciously sized positive displacement pumps to provide a fluid delivery system that delivers the maximum to minimum flow ratio without incurring excessive temperature rise in the fluid during the minimum regime of the pumping operation.

A still further feature of this invention is to provide a planetary gear system for driving a judiciously sized positive displacement pumps in a fuel delivery system for a gas turbine engine utilized in all types of applications without excessively increasing the temperature rise of the fuel in the minimum power regime of the engine's operating envelope.

Another feature of this invention is the fluid circuitry receiving fluid from the pumps that includes parallel flow lines interconnecting a single delivery line to the engine where one of the lines includes additional parallel flow lines including a fixed restriction and a spring biased check valve incorporated in these lines. As an alternate a still further feature of this invention is to substitute the spring biased check valve with a fixed restriction having a two way judiciously selected discharge coefficient. As another alternate and still further feature of this invention is to modify the EHV by adding an additional spool to it with a pair of cooperating fuel flow lines interconnecting the EHV for further improvement in fuel temperature rise. The latter alternate can be combined with the other two mentioned alternates.

A still further feature of this invention is to provide in a fluid pumping system as described means for permitting the monitoring of the health of the engine pumping system by sensing the operation of the pumps and/or the fuel therein.

A still further feature of this invention is to provide an improved pumping system utilizing a planetary gear system and a pair of positive displacement pumps that inherently eliminate the need of fuel metering valves or flow meters and by-pass valves that heretofore have been necessary.

The foregoing and other features and advantages of the present invention will become more apparent from the following description and accompanying drawings.

BEST MODE FOR CARRYING OUT THE INVENTION

While this invention will be described in connection with a fuel control system for a gas turbine engine for powering aircraft, as one skilled in this field of technology, this invention and the principles described herein have utility for other applications as for example driving land vehicles such as automobiles, vans, trucks and the like that use hydraulic motors to power the wheels without the need of fluid couplings.

As previously mentioned, the invention can be utilized in heavy equipment that requires larger actuators such as cranes, jacks, lifts, hydraulic elevation and the like.

Figure 1:
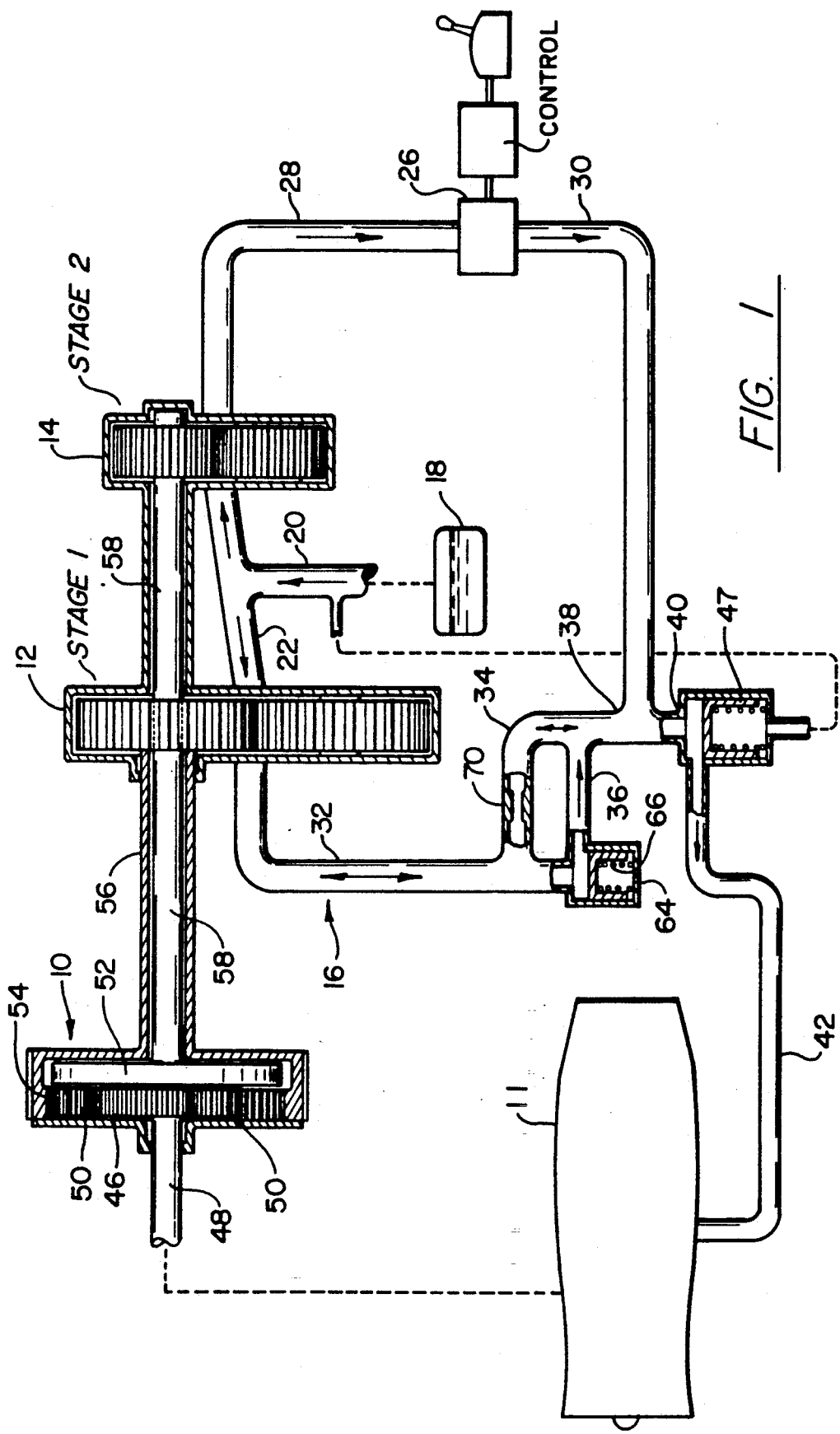
FIG. 1 is a view partly in section and partly in schematic illustrating an embodiment of this invention.
Figure 2:
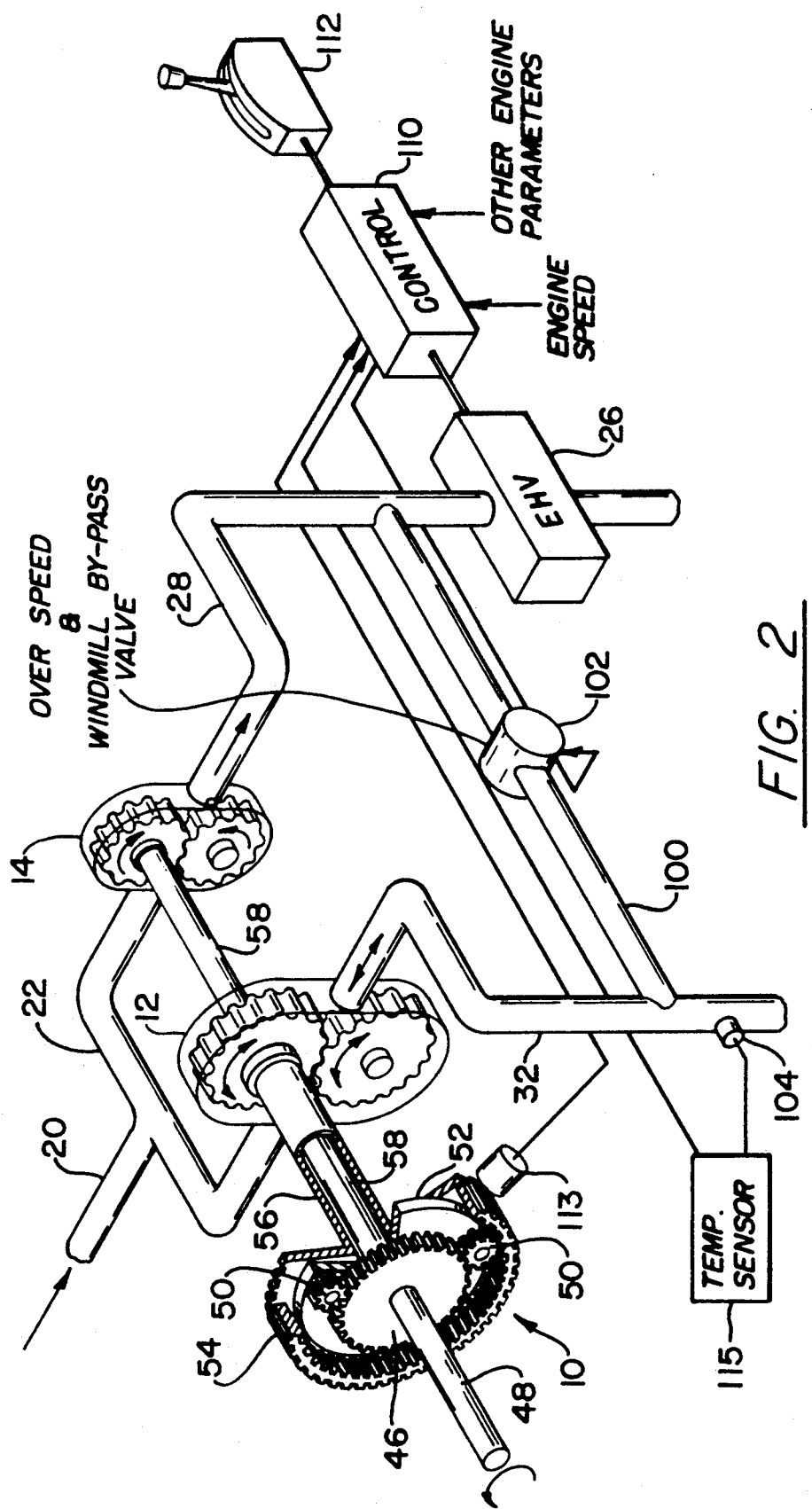
FIG. 2 is a partial view in perspective showing a portion of the system illustrated in FIG. 1.

Reference is made to FIGS. 1 and 2 that in perspective and schematic shows the operation of this invention. As was alluded to in the above the planetary gearing system generally indicated by reference numeral 10 serves to drive the pair of gear pumps 12 and 14 (stage 1 and stage 2 respectively) that control the flow in the fluid circuitry generally indicated by reference numeral 16. As noted, fuel is admitted to either gear pump 12 and 14 from a fuel reservoir 18 (which includes any required boost pump, not shown) through line 20 interconnecting line 22. A portion of this fuel is admitted into gear pump 12 and the remaining portion is admitted into gear pump 14. At certain operating points of the pump's operating envelope, the inlet of pump 12 will become the outlet of pump 12 and vice versa, as will be better understood in the description to follow. Fuel from the pumps can be delivered to the engine through lines 28, the electric hydromechanical valve 26 (EHV), 30, 40, and 42, and/or lines 32, 34 or 36 and 38, 40 and 42. A suitable and well known minimum pressure valve 47 disposed between lines 40 and 42 serves to assure that the fuel's pressure is delivered to the engine 11 solely upon reaching a predetermined value may be utilized. The minimum pressure valve has essentially two functions, namely:

(1) Since most aircraft engines use pressurized fuel to provide hydraulic power to actuate engine variable geometry actuators and other accessories, the minimum pressure valve must assure that the minimum pressure that these actuators require to provide the necessary minimum force is always available. Thus, the force levels required by the actuators dictate the minimum pressure levels. It, therefore, follows that since there is a mandatory minimum pressure level there is also a mandatory and necessary minimum horsepower required. For example, suppose the actuators require an increase in, say twice the existing pressure level, then, it is obvious that this increase will require a doubling of the horsepower to produce this increased pressure level. Since there is a direct relationship between horsepower and temperature, the increased pressure level will consequently cause the temperature rise to double.

And (2) the minimum pressure valve serves to provide a pressure drop tight shut-off valve.

While the minimum pressure valve has been utilized in gas turbine engine fuel systems for many years, and provides a necessary function, however, the need to utilize this valve has given rise to at least a portion of the problem which has necessitated the solution taught by this invention. In accordance with this invention and as was also alluded to in the above, the planetary gear train which includes sun gear 46, planetary gears 50 (3 spur gears), cage 52 supporting the planetary gears, and ring gear 54 serves to power stage 1 and stage 2 of the pumping system. Sun gear 46 is driven via shaft 48 which is connected to the engine's auxiliary power source through any suitable means. Sun gear 46, in turn, drives the planetary gears 50 which, in turn, drives either cage 52 and/or ring gear 54, or both depending on the resistance or the shared torque, as will be described in more detail hereinbelow. Ring gear 54 drives pump 12 (stage 1) through shaft 56 and cage 52 drives pump 14 (stage 2) through shaft 58. Through the combination of the proper sizing of the stage 1 and stage 2, the fluid circuitry and the planetary gear system and the relationship of one to the other, this invention minimizes the excess temperature rise occasioned during certain pumping conditions of the pumping systems operating envelope. This can best be understood by considering the operation of the pumping system to be described immediately herein below.

OPERATION

As one skilled in this art will appreciate, in order for gear pump 12 to develop any driving torque, planet gears 50 must provide resistance. If no fluid is allowed to flow from line 28 to line 30 by virtue of EHV 26 being closed, continued pumping will merely cause the pressure in line 28 to increase and creating this resistance. From a practical and realistic standpoint, gear pump 14 will turn at a very slow speed in order to make up for any leakage. From the foregoing it is apparent that the consequence of this high pressure this resistance is created which prevents the planetary gear from rotating and hence holds cage 52 and pump 14 almost stationary. Obviously, ring gear 54 at this time, which is being driven by the sun gear 46 via the planetary gears, is being driven at its maximum speed and accordingly pump 12 is pumping at its maximum capacity.

Looking at the flow in the flow circuitry 16, at this condition the output from gear pump 12, Stage 1, is operating at its highest flow rate delivering maximum fuel via line 32 and ultimately to the engine. In order for the flow in line 32 to flow to line 38 the flow must first flow through check valve 64 disposed between lines 32 and 36. This will occur when the pressure in line 40 is sufficiently high to overcome spring 66 of check valve 64. At this point check valve 64 will open and the flow will be directed into line 36 where it combines in lines 38 and 40 with a certain portion of the flow flowing through line 34 (some flow may also be added from line 30 if EHV 26 is slightly open). When the pressure in line 40 exceed the minimum value set by the minimum pressure valve 47 which is set to, say 100 psi above pump inlet pressure (sensed in a well known manner) the flow will proceed into line 42 where it is delivered to the engine's combustor (not shown).

Figure 6:
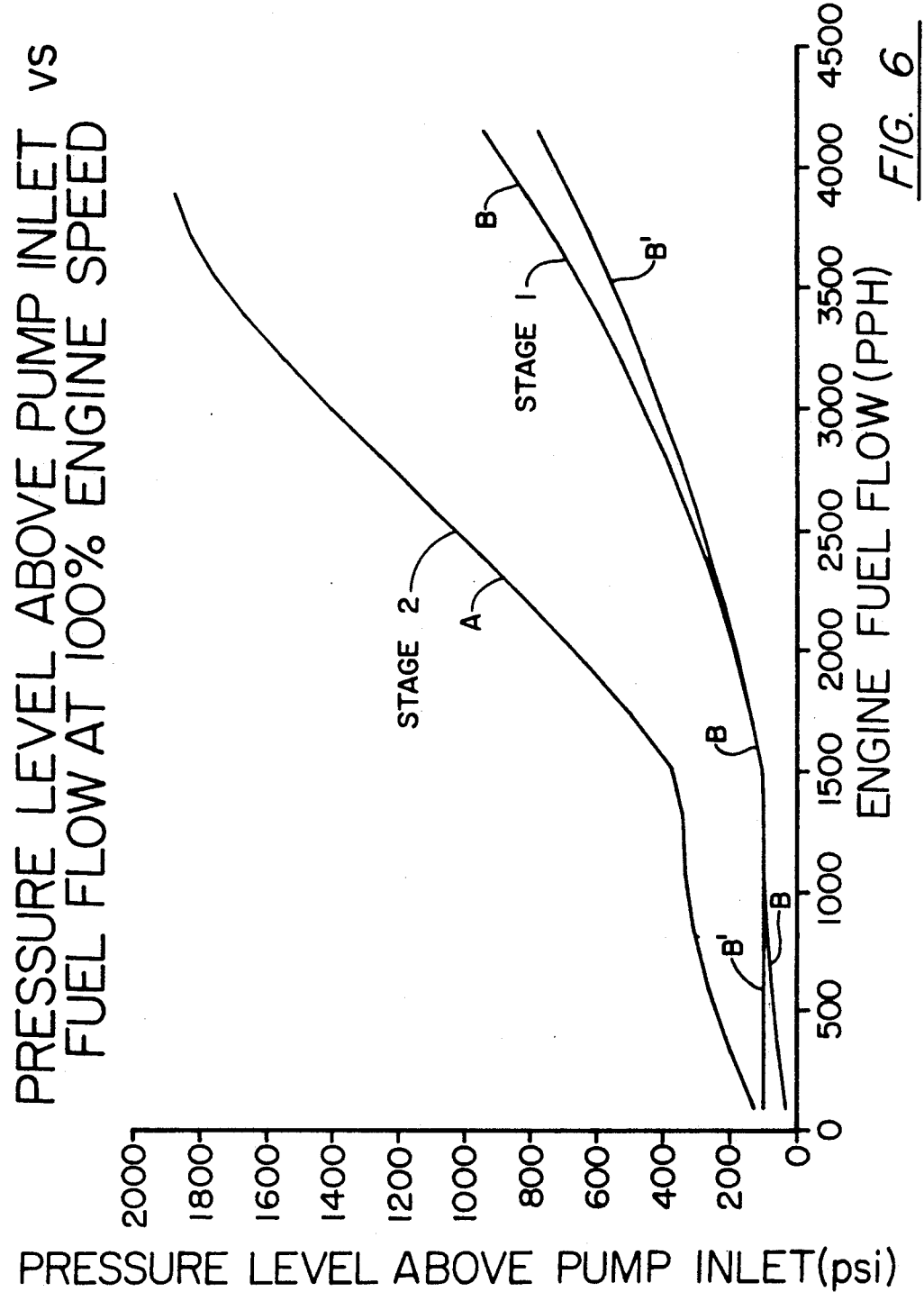
FIG. 6 is a graph illustrating a plot of stages 1 and 2 pumps of the pressure level above pump inlet pressure (psi) vs. engine full flow (pph) at 100% engine speed.

Next, observe what happens when the EHV 26 is opened. Some of the flow from line 28 will be allowed to flow into line 30 and hence, causing a reduction in the pressure and likewise a reduction in the resistance of pump 14 as alluded to in the above description. For the purposes of this explanation assume that gear pumps 12 and 14 are sized so that stage 1 provides approximately three times more flow than stage 2 when driven at equal speeds. Also assume that both pumps are running at 100% efficiency it will be obvious that the pressure level in line 28 will then be approximately three (3) times higher than the pressure level in line 32. Of course the efficiency is predicated on the operational speed of the pumps and the pressure levels, but taking these factor into account, it is readily apparent that the pressure level in line 28 will be somewhere between two (2) to three (3) times higher than the pressure level in line 32. This factor is evident by referring to FIG. 6 which is a plot of pressure level above pump inlet in pounds per square inch (psi) vs. engine fuel flow in pounds per hour (pph). As can be observed from curve A which represents stage 2 pressure, and curve B which represents stage 1 pressure quantities, this differential relationship between the two pressures of stage 1 and stage 2. Curve B' represents the pressure in line 40.

As EHV 26 continues to open flow is bled from line 28 and the resistance provided by the pressure level in line 28 continues to go lower allowing cage 52 to rotate faster and faster with a consequential increase in the speed of pump 14 (stage 2). The inverse happens to stage 1. Since ring gear 54 is sharing the speed with the planetary system it will be driven at a slower speed with a consequential reduction in speed of pump 12 (stage 1). The effect of opening EHV 26 is a decrease of flow to the engine. This is because stage 1 decreases flow faster than stage 2 increases flow, since stage 1 has three (3) times the capacity of stage 2.

At some point, the EHV 26 will open to allow sufficient flow to be bled from conduit 28 to lower the resistance even further thereon until the speed of stage 1 is reduced to zero. At this condition, all the flow (33% of the maximum flow in this example) being delivered to the engine will solely be from stage 2.

Next, consider what happens when EHV 26 is opened still further than the "zero" speed condition noted above. In this instance, part of the flow from stage 2 will start to drive stage 1 in the opposite direction, thereby reducing fuel flow further. At the point when gear pump 12 of stage 1 reverses, pressure in conduit 32 lowers, and check valve 64 closes. Flow will now proceed from line 38 through line 34, restrictor 70 and then through line 32. Restrictor 70 disposed in line 34 is judiciously sized to allow the pressure in line 28 to become lower to ultimately effectuate the lowering of the temperature rise of the fuel.

This is understandable, since there is a relationship between the pressures in lines 28 and 32 and is set by matching the torques of the gear pumps 12 and 14 which is established by the relationship of the speeds of the ring gear 54 and cage 52. Hence, by proper sizing of restriction 70 (approximately 0.13 inches in diameter in this example) the pressure in line 32 lowers as the flow in line 32 (when in the reverse direction) increases. Consequently, as the pressure in line 32 decreases it allows the pressure in line 28 likewise to decrease. Since the pressures in both lines 28 and 32 are allowed to decrease, it follows that less horsepower to drive the pumps is required. Since there is a direct relationship between the energy created by the pumps and the heat transfer from this energy to the fuel being recirculated through the pumps, it follows that since less pressure is being generated less horsepower to drive these pumps is required. Since there is a decrease in horsepower, it follows, that there is a consequential lowering of the temperature rise of the fuel. This, of course, is the objective of this invention.

Once the principles of this invention are understood, it becomes apparent that there are many modification that can be made without departing from the scope of this invention. As noted at a certain point in the operating envelope of the pumping system, the flow in line 32 reverses so that the outlet of pump 12 becomes the inlet. It is also noted that the pressure required to flow in line 32 in one direction is at a different value than the pressure required to flow in the opposite direction.

Figure 3:
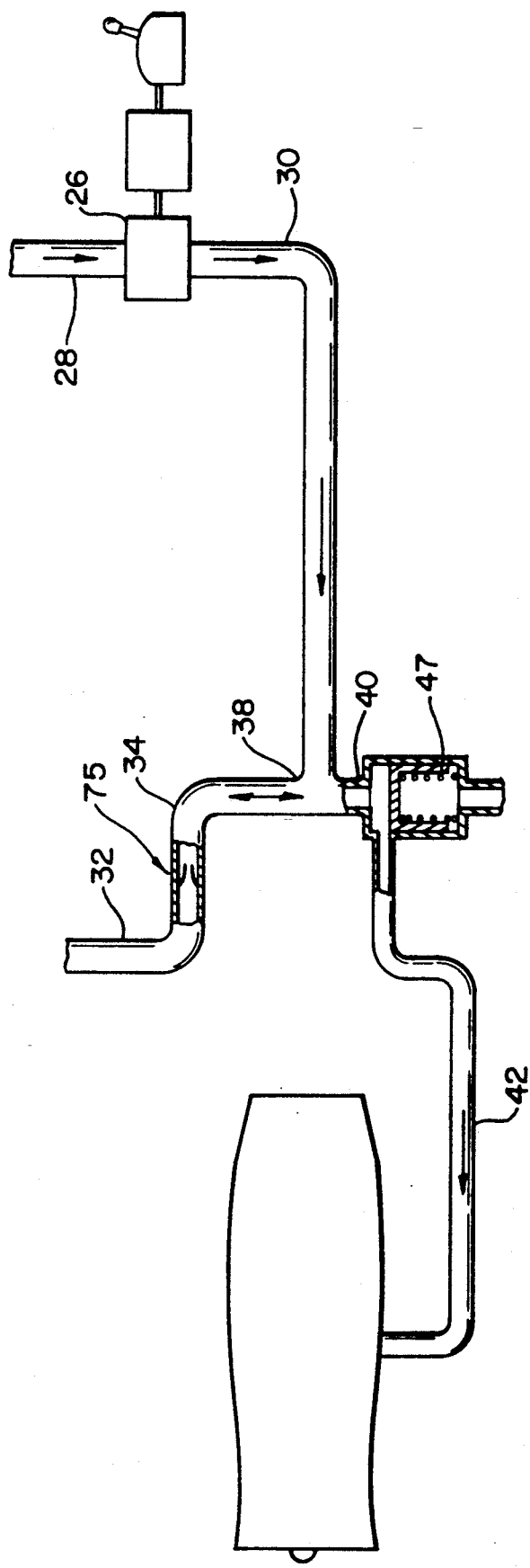
FIG. 3 is a partial view identical to FIG. 2 with a modification in the fluid circuitry to show an option of this invention.

The modification exemplified in FIG. 3 is another preferred embodiment that eliminates the check valve 66 by including a two way restrictor generally illustrated by reference numeral 75. (It will be noted that like reference numerals in all the FIGS. refer to like parts). As noted the coefficient of discharge of restrictor 75 in one direction is different than the coefficient of discharge in the reverse direction. The flow leaving line 32 toward the engine sees less resistance than it sees when it reverses to flow in the other direction toward pump 12. Restrictor 75 has the same effect as the check valve 66 and by-pass line 36 of FIG. 1. The two-way restrictor 75 has been known to provide approximately a two to one change in coefficient of discharge. The advantage of this modification is that it eliminates the moving parts and flow line that are a consequence of the check valve and its required additional flow line.

Figure 4:
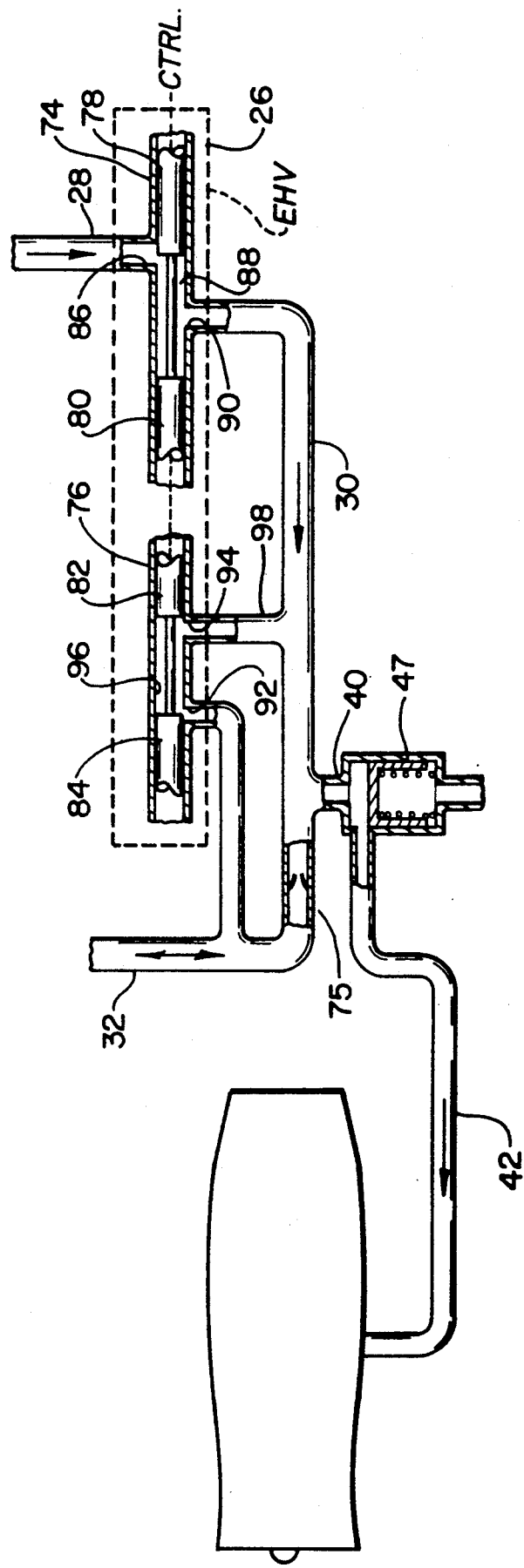
FIG. 4 is a partial view identical to FIG. 3 with a modification in the fluid circuitry to show another option of this invention including the option shown in FIG. 3.

FIG. 4 exemplifies another embodiment of this invention and it modified the EHV 26 and adds certain flow lines in order to enhance the temperature rise limitations at lower engine speeds. This arrangement may be employed with either the system disclosed in FIG. 1 or may be equally employed with the system disclosed in FIG. 3. It is to be understood that planetary gear system and stage 1 and stage 2 pumping systems remain virtually unchanged. As noted EHV 26 is expanded to include spool valve 74 having spool 76 carrying lands 78, 80, 82 and 84. Land 78 cooperates with port 86 which communicates with line 30 via annular passage 88 and port 90. Positioning spool 76 to the right as viewed in FIG. 4 opens EHV 26 (line 28 to line 30) and hence decreases fuel flow to the engine. This simultaneously closes off port 92 via land 84 and dumps flow from line 30 into line 40 and to the engine via minimum pressure valve 46 and line 42. This, of course, is the condition of the pumping system at the low fuel flow portion of the operating envelope, say at engine idle speed. During a high fuel flow requirement both port 92 and port 94 are communicating line 32 to line 30 via the annular passage 96 in spool valve 76 and line 98.

From the foregoing it is apparent that the modifications of flow circuit 16 in FIGS. 1, 3 and 4 are essentially options that one skilled in the art can avail himself of. The options in FIG. 1 and FIG. 4 as noted above can be combined as can the options in FIG. 3 and FIG. 4. FIG. 4 which combines with option 3 will provide the best temperature performance (temperature rise limit) when the drive speed will vary over the range of 10% to 100% speed. The system in FIG. 4 is shown with the 2 way restrictor 75. It can also be utilized without the two way restrictor.

As one skilled in the art will recognize, the sizes and shapes of the ports 86, 92 and 94 can be tailored to provide optimum performance, all of which is dependent on the particular input conditions and customized performance required.

Figure 9:
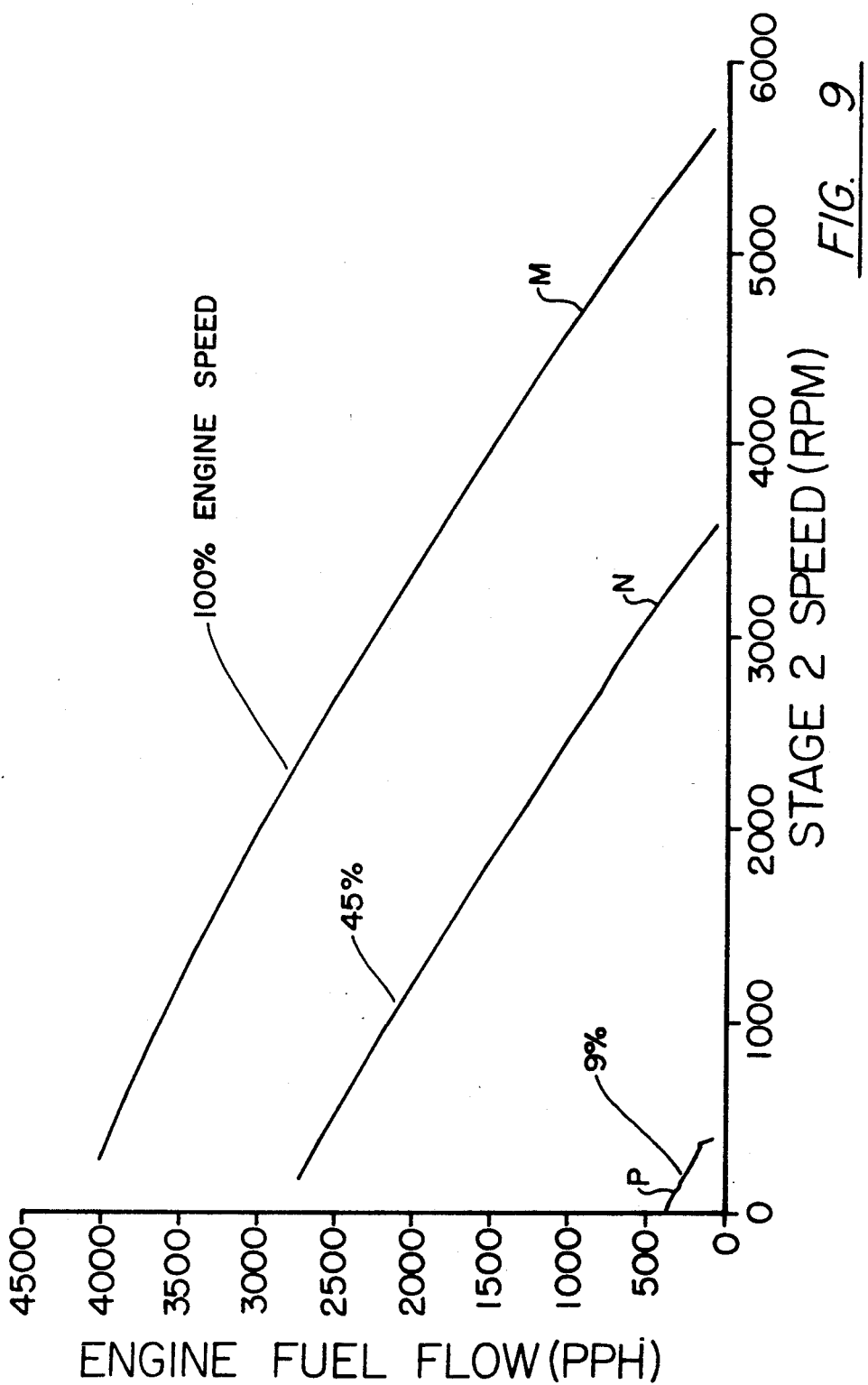
FIG. 9 is a graph illustrating a plot of engine fuel flow vs the speed of stage 2 of the present invention for several engine speeds.

One of the biggest benefits of this invention along with the lower temperature rise is the ability to know fuel flow and determine pump degradation. To one skilled in the science of control diagnostics, it is possible, from the parameters defined, to provide algorithms in the FADEC which will provide pump and flow performance. The flow delivered is a function of the two pump speeds in relationship to the input speed. If stage 1 and 2 pump speeds are known then input speed can be derived. Therefore, all a FADEC needs to know are the two pump speeds, fuel temperature (only because of fuel inlet temperature changes), and the relationship between the two pumps and fuel flow. FIG. 9 which is a plot of fuel flow vs. stage 2 speed at 100, 45, and 9% engine speed shows this relationship. An equation can be made that will provide fuel flow as a function of the two pump speeds. Pump health can be monitored by knowing the pump speeds and the area of the EHV (a function of EHV valve stoke) as well as fuel temperature. It is also recognized that the FADEC already knows engine speed and since if any two speeds of a planetary gear system is known then the third can be calculated. This will allow one of the speed pick-ups to be eliminated.

As seen in FIG. 2, the speed sensor 113 senses speed of the ring gear 54 which is transmitted to the control for this purpose. Temperature sensor 115 likewise transmits a temperature signal to the control. The control in turn, which as mentioned above, is a special digital computer that can utilize these signals for monitoring the health of the pumping system.

The temperature sensor can be eliminated if only one type of fuel is used.

Figure 5:
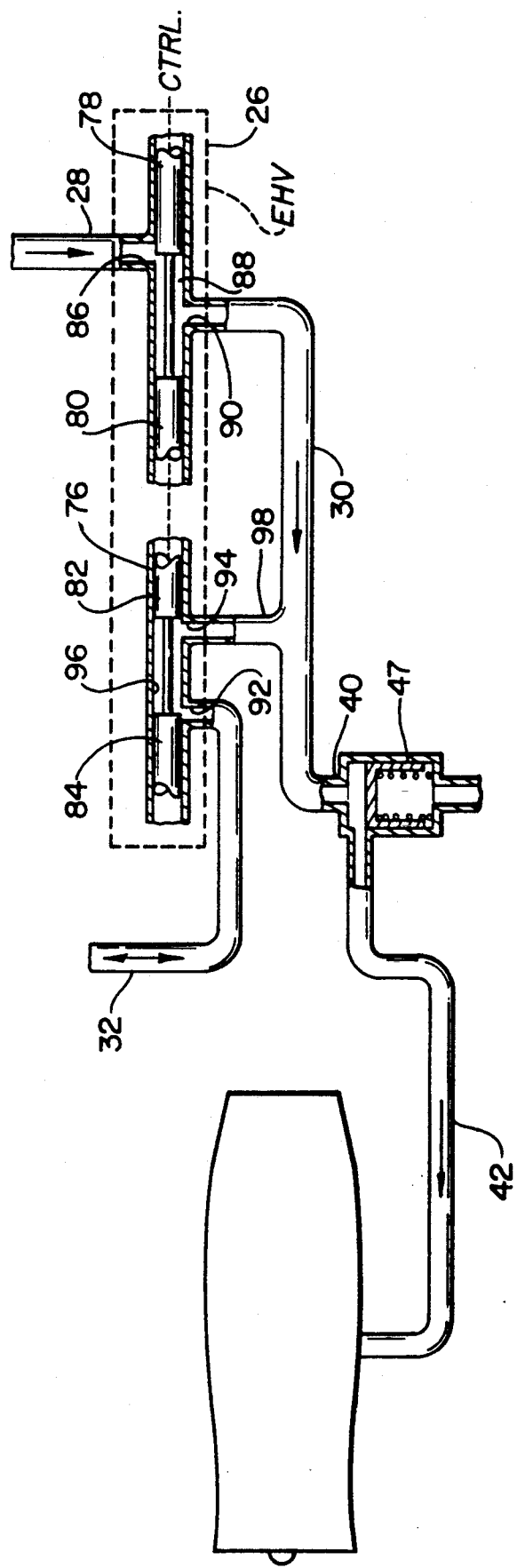
FIG. 5 is identical to FIG. 4 except with the combined option shown in FIG. 3 removed.

An over-speed function and windmill by-pass can be added by a solenoid valve between lines 28 and 32 as shown in FIG. 2. This function would simply bypass the EHV 26, check valve 66 and restrictor 70 (FIG. 1) or EHV 26 and restrictor 75 (FIG. 3), or EHV 26, restrictor 75 and spool value 76 (FIG. 4), or EHV 26 and spool valve 76 (FIG. 5) by virtue of line 100 and solenoid valve 102 responding to a suitable signal.

As is apparent from the foregoing the pumping systems disclosed in the present invention when employed with a gas turbine engine will deliver fuel to the engine's combustion upon demand of the pilot or an override provided by the control is generally indicated by reference numeral 110. The control 110, whether a FADEC type, hydromechanical type or other will monitor certain engine parameters including the position of the power lever 112 to produce the desired thrust in a well known manner, taking into account accelerations, decelerations, engine rich and lean blow out, performance and the like. It will be understood by those skilled in this art that the only type of control employed can be made compatible with the pumping system of this invention.

Figure 7:
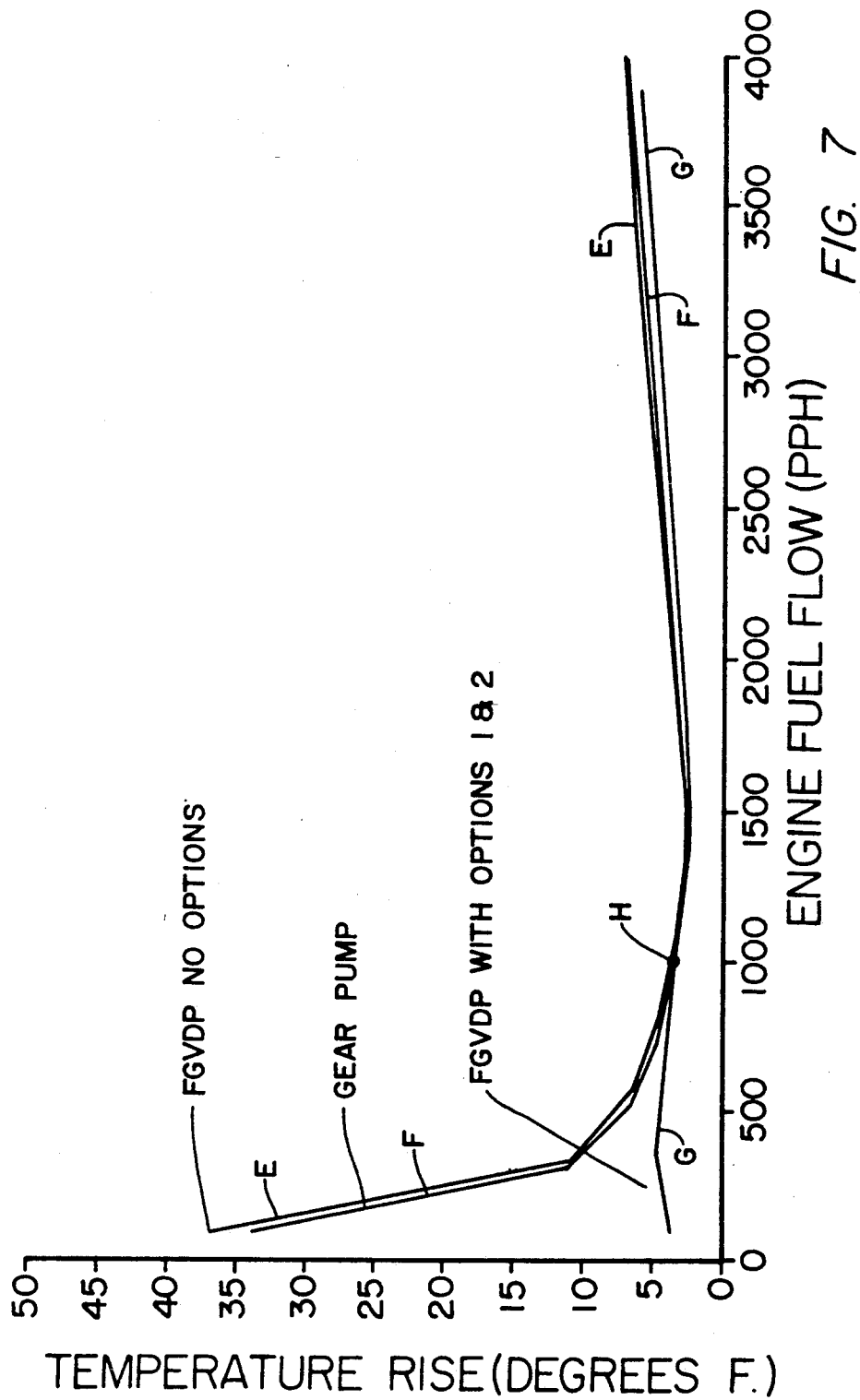
FIG. 7 is a graph showing a plot of temperature rise in degrees Fahrenheit (°F.) vs. engine fuel flow (pph) comparing a gear pump and a fixed geometry variable displacement pumping system without the invention and with the incorporation of the invention.
Figure 8:
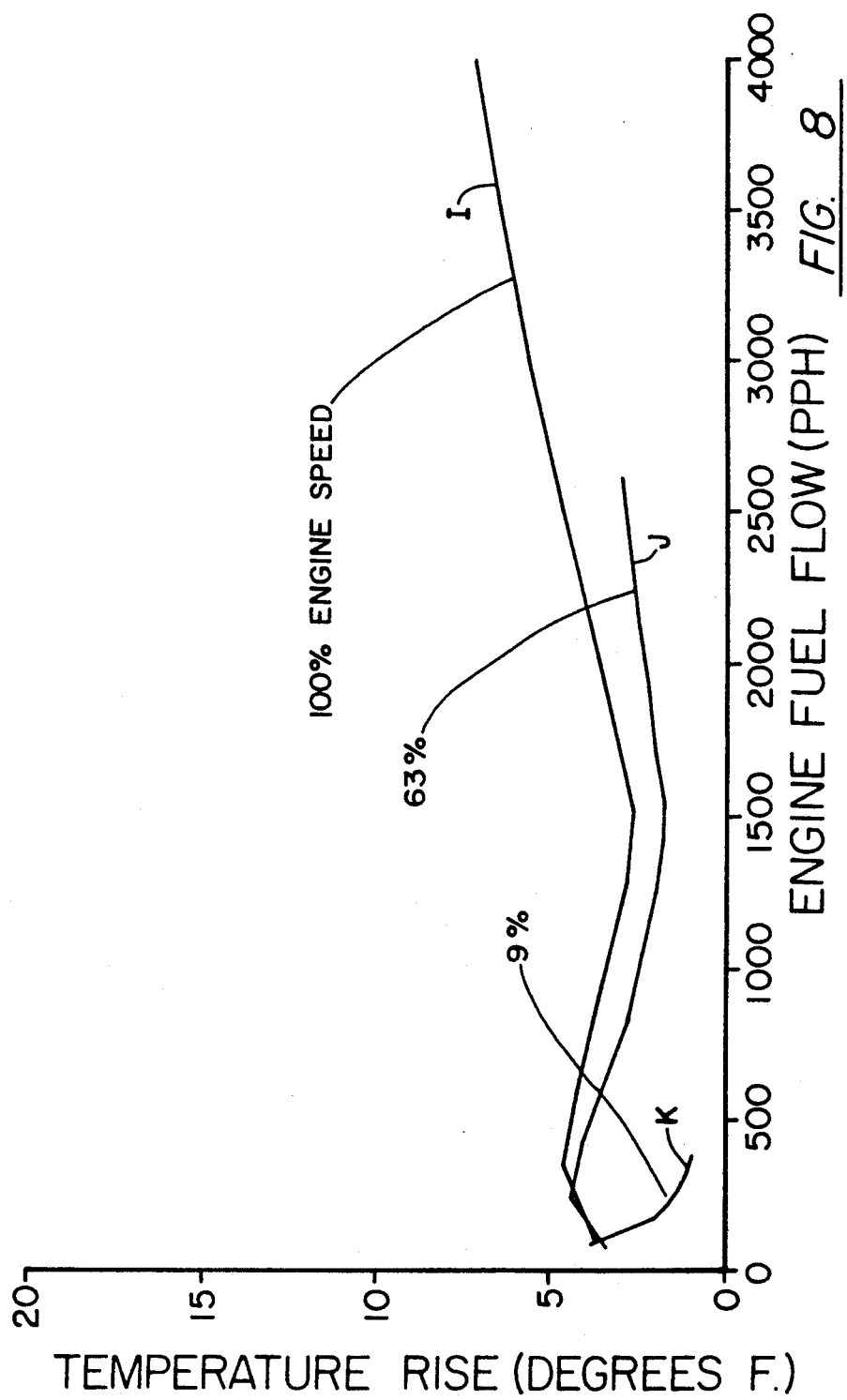
FIG. 8 is a graph illustrating a plot of temperature rise (°F.) vs. engine utilizing this invention for several engine speed levels.

Without limitation, what this invention accomplishes is that at certain operating levels of the pump's operating envelope, the temperature rise is limited. FIGS. 7 and 8 graphically demonstrate this feature. FIG. 7 which is a comparison of positive displacement pumping systems that do not utilize this invention with one that does. Curve E represents a fixed geometry variable displacement pump system (no options) and curve F represents a gear pump that does not utilize this invention. Curve G represents the present invention employing the options depicted in FIGS. 1, 3, 4 and 5. It will be noted that at point H when engine fuel flow is less than 1000 pounds per hour the temperature rise of the present invention (curve G) remains under 5 degrees F. While the other two systems (curves E and F) the temperature rise goes up astronomically. FIG. shows the temperature rise condition for given engine speeds, namely 100% (curve I), 63% (curve J) and 9% (curve K) at the engine fuel flow (pph).

It will also be appreciated by anyone skilled in this art that the planetary gear train is merely representative of any other differential drive that drives two pumps (state 1 and stage 2) by a single input drive. Hence, this invention contemplates the use of any differential gear train or differential pumping system that is driven by a single input.

What will be appreciated by those skilled in the art, as represented by FIG. 9 the selection of the differential gear system, whether planetary or any other known types, or differential pumping system, the sizing of the pumps 12 and 14, that provide the capacities of stages 1 and 2 can be selected so that one stage provides a given percentage of flow of the other stage and will be predicted on the particular application requirements. In the example selected in the above description as depicted by FIG. 9, stage 2 speed will provide the fuel flow to the engine illustrated by curves M, N and P at 100%, 45% and 9% of engine speed. Obviously the quantity will vary depending on the capacity sizes selected for stage 1 and stage 2.

Although this invention has been shown and described with respect to detailed embodiments thereof, it will be appreciated and understood by those skilled in the art that various changes in form and detail thereof may be made without departing from the spirit and scope of the claimed invention.

I claim:

1. A fuel pumping system for a gas turbine engine including a fuel delivery system having a differential mechanism driven by said engine, said differential mechanism sharing the load of at least two pumping systems, said two pumping systems including a first positive displacement pump and a second positive displacement pump, fluid circuit means including a first fuel connection means fluidly connected to said first positive displacement pump, a second fuel connection means fluidly connected to said second positive displacement pump, a third fuel connecting means fluidly connected to said first and said second fuel connecting means and said gas turbine engine, said second fluid connecting means being fluidly connected to said first fluid connecting means, valve means fluidly connected to said first fluid connecting means for regulating the flow therein, control means responsive to operating parameters of said gas turbine engine for controlling said valve means, means for restricting the flow in said second fluid connecting means so that the flow in one direction has less resistance than the flow in the reverse direction, said first positive displacement pump having less pumping capacity than said second positive displacement pump at a given speed so that increasing the flow of fuel through said valve means causes flow through said first fluid connection means to reverse flow in said second fluid connecting means back to said second positive displacement pump, and a fourth fluid connection means for delivering fuel to said first and said second positive displacement pumps, whereby said control means is adapted to open said valve means for reversing flow in said second fluid connection means back to said second positive displacement pump to change the load sharing between said first and second positive displacement pumps so that the temperature rise of the fuel flowing through said pumps is limited to a predetermined value.

2. A fuel pumping system as claimed in claim 1 including a minimum pressure valve disposed between said first and said second fluid connected means and said gas turbine engine for allowing the delivery of fuel to said engine upon the fuel reaching a predetermined pressure.

3. A fuel pumping system as claimed in claim 1 wherein said flow resisting means includes a two way restrictor disposed in said second fluid connected means whereby the flow through said restrictor in one direction has less resistance than the flow through said restrictor in the opposite direction.

4. A fuel pumping system as claimed in claim 1 wherein said flow resisting means includes a restrictor disposed in said second fluid connected means between said second positive displacement pump and said first fluid connected means, a by-pass connection means interconnecting said second fluid connected means and said first fluid connected means by-passing said restrictor, and a check valve disposed in said by-pass connection means interconnecting said second and said first fluid connected means when the pressure in said second fluid connected means reaches a predetermined value.

5. A fuel pumping system as claimed in claim 1 including additional fuel regulating means in said valve means for regulating the flow of fuel from said first fluid connected means to said second fluid connected means.

6. A fuel pumping system as claimed in claim 3 including a by-pass fluid connection means interconnecting said first and said second fluid connected means and including additional fuel regulating means in said valve means disposed in said by-pass fluid connection means for regulating the flow therein.

7. A fuel pumping system as claimed in claim 1 wherein said differential mechanism includes a planetary gear system comprising a sun gear, a planetary gear, a ring gear, means operatively connecting said engine for rotatively driving said sun gear, said sun gear rotatively driving said planetary gear and/or said ring gear, said planetary gear operatively connected to said first positive displacement pump, said ring gear operatively connected to said second positive displacement pump, whereby the rotational speed of said first and said second positively displacement pump is dependent on the pressure and direction of the fluid in said first and said second fluid connected means.

8. A fuel pumping system as claimed in claim 2 including a by-pass fluid connection means interconnecting said first and said second fluid connected means and by-passing said valve means and said minimum pressure valve means, a normally closed shut-off and windmill valve means disposed in said by-pass connection means responsive to the rotational speed of said gas turbine engine for opening said shut-off and windmill valve means, whereby the flow of fuel normally flowing to said engine is by-passed upon the rotational speed of said engine reaching a predetermined value.

9. A fuel pumping system as claimed in claim 1 including means for sensing the temperature of the fuel in said second fluid connection means for generating a first signal, and means for sensing the speed of said first and said second positive displacement pumps for generating a second signal and means responsive to said first signal and said second signal for computing the diagnostics of said fuel pumping system.

10. A fuel pumping system as claimed in claim 9 including means responsive to said first signal and said second signal for generating a signal indicative of the amount of fuel being delivered to said gas turbine engine.

* * * * *